United States Patent [19]

Fu et al.

[11] Patent Number: 5,032,983
[45] Date of Patent: Jul. 16, 1991

[54] ENTRY POINT MAPPING AND SKIPPING METHOD AND APPARATUS

[75] Inventors: Peter L. Fu, Sunnyvale; Daniel E. Lenoski, Mountain View, both of Calif.

[73] Assignee: Tandem Computers Incorporated, Cupertino, Calif.

[21] Appl. No.: 409,978

[22] Filed: Sep. 18, 1989

Related U.S. Application Data

[63] Continuation of Ser. No. 36,606, Apr. 10, 1987, abandoned.

[51] Int. Cl.[5] .................................................. G06F 9/26
[52] U.S. Cl. ................................... 364/200; 364/262.7; 364/262.8; 364/251.2
[58] Field of Search ... 364/200 MS File, 900 MS File

[56] References Cited

U.S. PATENT DOCUMENTS

| | | | |
|---|---|---|---|
| 3,634,883 | 1/1972 | Kriedermacher | 364/200 |
| 3,646,522 | 2/1972 | Furman et al. | 364/200 |
| 3,736,563 | 5/1973 | Beckinger et al. | 364/200 |
| 3,766,532 | 10/1973 | Liebel | 364/200 |
| 4,651,275 | 3/1987 | McDonough | 364/200 |

Primary Examiner—Lawrence E. Anderson
Attorney, Agent, or Firm—Townsend and Townsend

[57] ABSTRACT

A fixed entry-point map to produce an entry point address of a first micro-instruction for a particular macro-instruction. That address is then incremented by a fixed number to produce the second, third, etc. micro-instructions for that macro-instruction. In a first embodiment, after a fixed number of these address skips, the addresses are incremented by 1 so that successive micro-instructions are in adjacent address locations. In a second embodiment, the number of skips is variable.

13 Claims, 2 Drawing Sheets

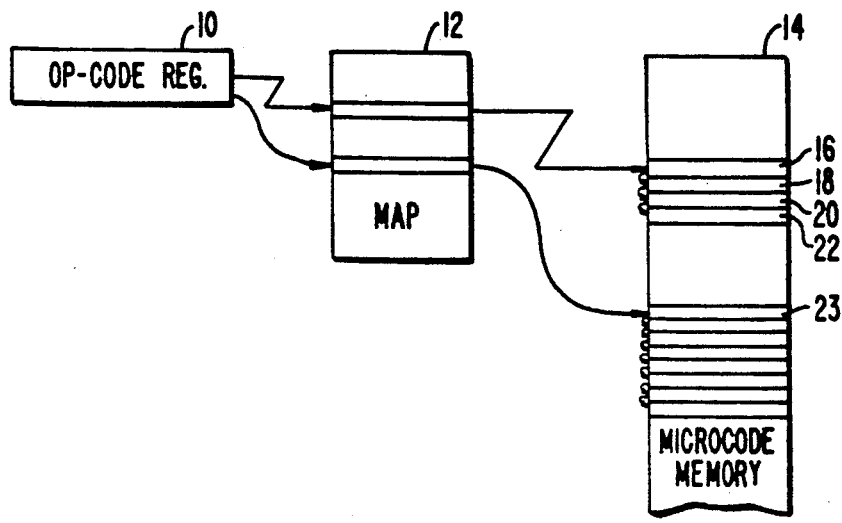
FIG._1. PRIOR ART
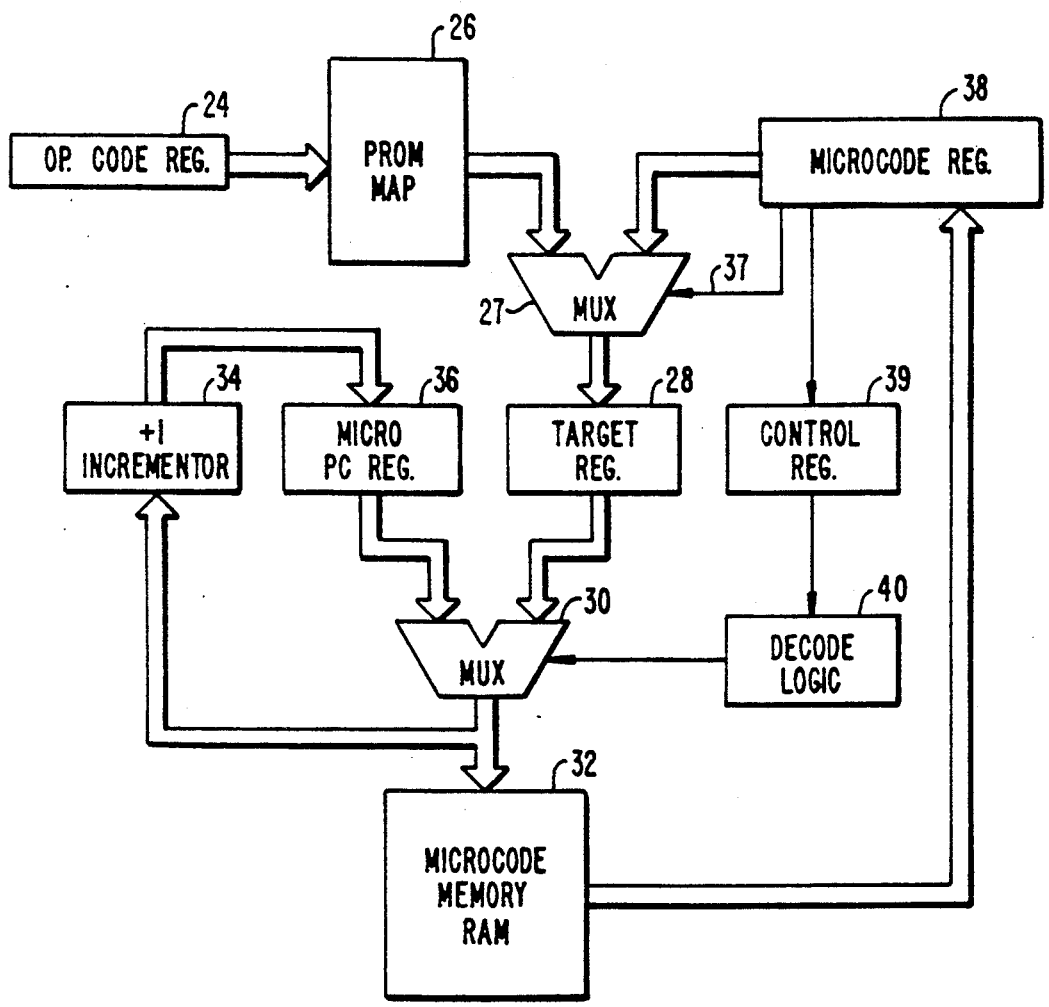
FIG._2. PRIOR ART

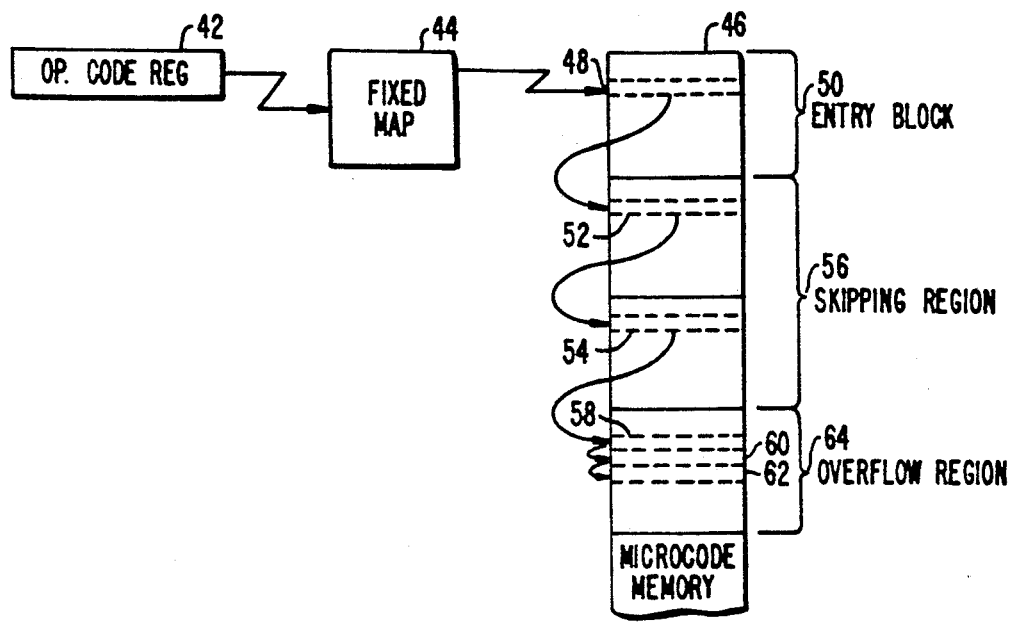
FIG._3.
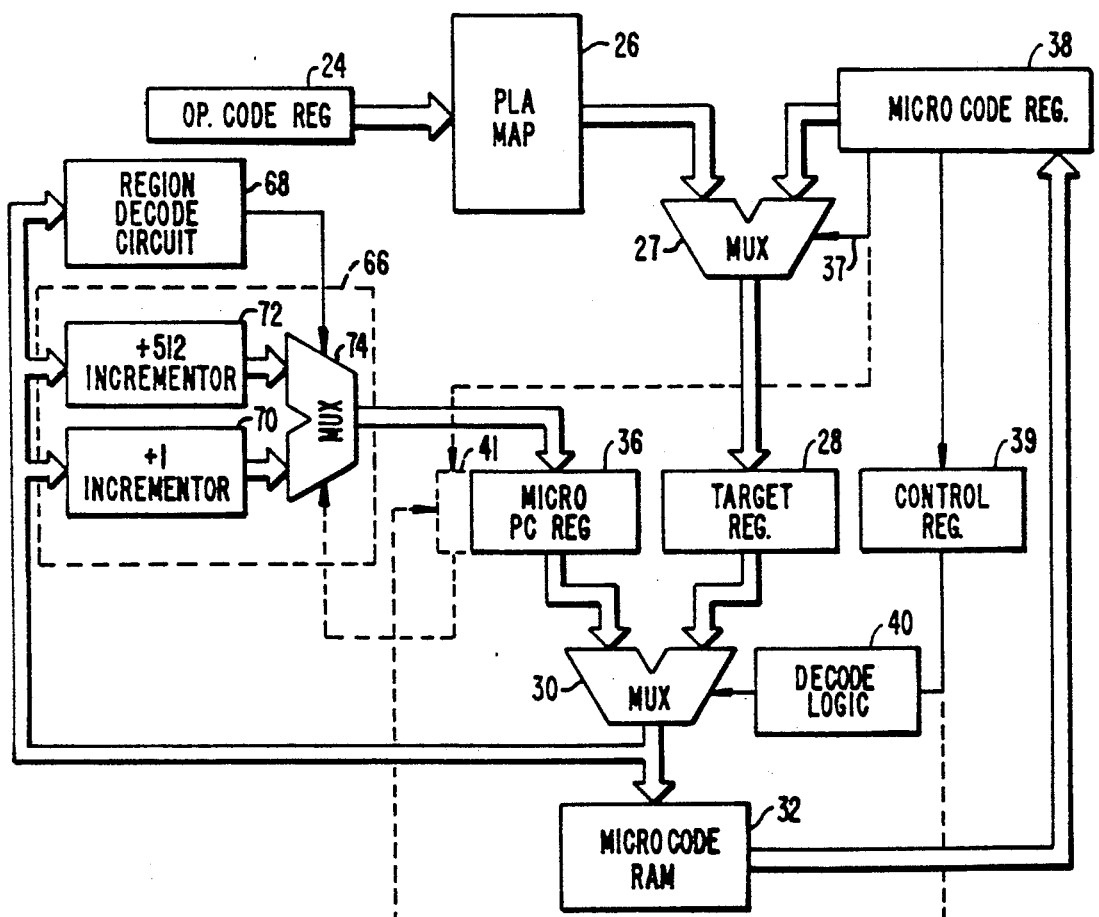
FIG._4.

ENTRY POINT MAPPING AND SKIPPING METHOD AND APPARATUS

This is a continuation of application Ser. No. 07/036,606, filed Apr. 10, 1987, now abandoned.

BACKGROUND

The present invention relates to methods and apparatus for mapping a macro-instruction to a microcode instruction memory.

Many computers today execute instructions by storing a number of microcode instructions for each macro-instruction in a microcode memory. The microcode instructions are then executed for the particular macro-instruction to implement the macro-instruction. A typical method is shown in FIG. 1, where a macroinstruction is placed into an operation code instruction register 10. The instruction in register 10 is then decoded by a mapping circuit 12 to produce an address which is provided to a microcode memory 14. This address will be the address of the first microinstruction in a series of micro-instructions to implement the particular macro-instruction. The remaining micro-instructions are obtained by incrementing the first micro-instruction address 16 by one after that micro-instruction is executed to produce successive micro-instructions 18, 20 and 22 for the macroinstruction.

In one implementation, each macro-instruction is allocated a fixed number of micro-instructions. If this fixed number is four, for instance, then any macro-instruction which requires more than four microinstructions must include a jump in the last microinstruction to a separate area of the microcode memory 14. A jump is undesirable because it places additional requirements on the microcode in terms of time or space. To do a jump, a jump address must be specified, and this requires space. In addition, another clock cycle may be required for a jump. To avoid the requirement of a jump, enough space can be allocated to accommodate the largest macro-instruction, but this results in a large number of wasted memory spaces for macro-instructions which require less than the maximum number of micro-instructions. Alternately, the microcode memory could be divided into groups of different fixed sizes with the sizes varying by a power of two (i.e., groups of four, eight, sixteen, etc.). Thus, a short macro-instruction could be allocated for microcode addresses 16–22 as shown in FIG. 1, while a longer macro-instruction can be allocated eight microcode memory addresses starting at location 23 as shown in FIG. 1. Numbers of microcode addresses which are not a power of two cannot be accommodated without requiring additional circuitry for mapping circuit 12. A power of two implementation can be done simply by blocking out unwanted bits to result in a higher number.

Map circuit 12 could be implemented to accommodate a particular instruction set so that the number of micro-instruction addresses allocated to a particular macro-instruction varies. This would require that either the instruction set be fixed at the time the map is fixed or that the map circuit itself be programmable.

SUMMARY OF THE INVENTION

The present invention uses a fixed entrypoint map to produce an entry point address of a first micro-instruction for a particular macro-instruction. That address is then incremented by a fixed number, such as 512, to produce the second, third, etc. microinstructions for that macro-instruction. After a fixed number of these 512 address skips, such as 6, the addresses are incremented by 1 so that successive micro-instructions are in adjacent address locations.

The determination of whether to increment the address by 512 or by 1 is done by a decode circuit which simply looks at the current address to determine whether it is in the skipping region of the microcode memory or the successive incrementing region. The present invention thus provides flexibility to the microinstruction addressing with the minimal addition of circuitry. In addition, the method of the present invention allows the entry point map to be fixed, and thus there is no need for it to be programmable.

The macro-instructions are arranged so that any macro-instruction requiring more than six micro-instructions is followed by one or more macro-instructions which require six or less micro-instructions. Thus, when the first macro-instruction starts executing the microinstructions in the increment by one region of memory, these memory addresses will be available since the next succeeding macroinstructions will not extend that far.

Alternately, a variable skipping region can be used to give more flexibility. This flexibility enables the skipping regions to be determined when the code is written, thus enabling the optimization of memory space. A variable skipping region implementation requires a slightly more complex method of determining whether the address should be an increment of one or a skip increment upon returns from subroutine calls, since it is not simply dependent upon the fixed address.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a diagram of a microcode memory mapping scheme of the prior art;

FIG. 2 is a block diagram of a prior art microcode addressing circuit;

FIG. 3 is a diagram of a microcode mapping scheme according to the present invention; and FIG. 4 is a block diagram of a microcode addressing scheme according to the present invention.

DETAILED DESCRIPTION OF THE PREFERRED EMBODIMENTS

FIG. 2 shows one type of implementation of microcode address generation according to the prior art which will aid in understanding the present invention. An operation code register 24 stores a macroinstruction which is decoded by a map circuit 26 to provide a microcode memory address to target register 28. Map circuit 26 is shown as being a programmable read-only memory (PROM), but could take other forms. Target register 28 receives the initial address from map circuit 26 through multiplexer 27 and provides it through a multiplexer 30 to the microcode memory 32. The micro-instruction at that address is provided to microcode register 38. The address is then incremented by a +1 incrementer 34 which is then provided to a micro program counter register 36. This incremented address is provided through multiplexer 30 back to memory 32 to provide the next micro-instruction to microcode register 38. This type of incrementing continues until there is a jump or other instruction which is detected by decode logic 40. Typically, a jump is executed by providing a jump address from microcode register 38 to multiplexer 27. A select signal 37 is provided from microcode register 38 to select the microcode jump address from microcode register 38 which is then provided to target register 28. A control bit or bits are latched into control register 39 which are then decoded by decode logic 40. Decode logic 40 then provides a select signal to multiplexer 30 to select a jump address in target register 28 as opposed to the incrementing address from micro program counter register 36. At the end of a micro-instruction, an instruction dispatch jump is done in which select signal 37 from multiplexer 27 selects the next instruction address from map circuit 26, and a new instruction is then executed.

FIG. 3 is a diagram of a microcode memory mapping scheme according to the present invention. An operation code register 42 is provided to hold a macro-instruction. A fixed map 44 decodes the macroinstruction to produce an address to a microcode memory 46. The first address provided is an entry point address 48 in an entry block 50. The next micro-instruction is found by incrementing address 48 by a fixed number to produce a second address 52. This address is in turn incremented by the same number to produce a third address 54. These addresses are located in a skipping region 56, which, in one embodiment, includes six skips for each macro-instruction (only three are shown in FIG. 3). After the six skips, an address 58 is incremented by one to produce addresses 60 and 62 in succession in an overflow region 64.

This mapping scheme provides flexibility for mapping macro-instructions having different numbers of micro-instructions. For instance, if entry point address 48 is address 212 and the macro-instructions having entry point addresses of 213 and 214 are less than six micro-instructions long, then address locations 60 and 62 will be blank, allowing the macroinstructions starting at address 48 to have eight micro-instructions. By appropriate placement of the starting address of each macro-instruction, the instructions can be mapped to make optimum use of the memory by appropriate programming of the microcode while at the same time allowing for a simple fixed map 44 because of the fixed entry point address for each macro-instruction. The use of a fixed entry point allows smaller, faster logic to be used. The logic is high speed because less logic is required than a RAM or PROM. In addition, because the logic is special purpose, it takes up less space than a RAM or PROM, which is especially important when the circuit is put on an integrated circuit.

A block diagram of a circuit to implement the mapping scheme of FIG. 3 is shown in FIG. 4. The block diagram of FIG. 4 follows the basic structure of that of FIG. 2. However, instead of using a +1 incrementer 34 as in FIG. 2, a variable incrementer 66 is used with a memory region decode ct 68. Variable incrementer 66 includes a +1 incrementer 70 and a +512 incrementer 72 as well as a multiplexer 74. In operation, the address provided to microcode RAM 32 is incremented by 512 by incrementer 72 with the new address being passed through multiplexer 74 to microcode program counter register 36. This process continues until memory region decode circuit 68 detects that the address corresponds to overflow region 64 of FIG. 3. At this point, decode circuit 68 provides a select signal to multiplexer 74 to select the output of +1 incrementer 70. Accordingly, thereafter the address to microcode RAM 32 is incremented by 1 as shown in FIG. 3.

Although variable incrementer 66 is shown as a pair of incrementers and a multiplexer for sake of understanding, it can be implemented with a single counter which allows for multiple carry bit inputs. Region decode circuit 68 can simply select a position of the carry bit to vary the increment. Decode circuit 68 only needs to look at the upper bits of the address to determine whether it is in overflow region 64.

Although a 512 increment which is repeated six times is shown, any other numbers could be used. FIG. 3 actually shows three skips in the skipping region, although any other number could be used.

In an alternate embodiment, the skipping region of FIG. 3 can be made of variable length. This provides additional flexibility when the microcode is programmed. For instance, if a number of instructions requiring only a few address locations each, such as three each, are grouped together, then a block of memory in the section which would normally correspond to the fourth address location for each instruction is freed for other uses.

In one implementation of a variable skipping region, skipping is done until there is a jump or branch in the program. In this case, upon a return from the jump or branch, the skipping incrementer is no longer used and the +1 incrementer is used. As shown in FIG. 4, this extra bit can be stored in a position 41 shown in phantom attached to micro PC register 36. A control line from bit position 41 is provided to multiplexer 74. This control line replaces the select line from region decode circuit 68, which would not be used in this implementation. Upon a branch, a bit is stored in position 41 and upon return from branch, this bit selects incrementer 70 by the appropriate control signal to multiplexer 74. Typically, the branch address is stored in a return stack (not shown). The extra bit is positioned in the return address stack so that when the address is provided to micro PC register 36, this bit is in position 41. The input to bit position 41 is provided by control signal line 37, shown in phantom. The loading of this bit into micro PC register 36 is done by a load control signal from control register 39 (shown in phantom).

The variable skipping embodiment thus allows variation in the number of address locations per instruction while still maintaining the fixed entry point mapping system. This flexibility allows changes to be made to the microcode as it becomes more complicated or simpler by adjusting the skipping region. In addition, regions which are not a power of two with respect to each other can be used, since the determination of the region length is done by the positioning of the jump instruction, and not by the addition of circuitry to the mapping circuit.

As will be understood by those familiar with the art, the present invention may be embodied in other specific forms without departing from the spirit or essential characteristics thereof. For example, instead of using a decoding circuit to determine whether the address is in the skipping region or the overflow region, a counter could be used to count the number of skipping increments by incrementer 72. The variable skipping region could also be implemented in different ways, such as by using a bit in the microcode instruction so that the skipping region is not dependent upon jumps. Accordingly, the disclosure of the preferred embodiments of the invention is intended to be illustrative, but not limiting, of the scope of the invention which is set forth in the following claims.

What is claimed is:

1. In a method for executing a macro-instruction with a series of microcode instructions stored in a microcode memory, an improved method for addressing the memory comprising the steps of:
   (a) providing an entry point address of said microcode memory to an address register for said macroinstruction;
   (b) repeatedly incrementing said address register by a first predetermined number (F) greater than one to provide an address of a next microcode instruction in said microcode memory, in a first, skipping mode such that microcode instructions for other macro-instructions are skipped over;
   and incrementing said address register by one in a second, normal mode, such that addresses can be automatically incremented in both said first and second modes without reference to said microcode instructions for an increment amount
   whereby to obtain the address of the next microinstruction during the execution of the macroinstruction the current address is first incremented by said first predetermined number and subsequently incremented by one without reference to the microinstructions.

2. The method of claim 1 wherein said second mode is entered upon the taking of a jump.

3. The method of claim 1 wherein said first, skipping mode continues while said address register contains an address in a first, fixed skipping address region.

4. The method of claim 3 wherein said first predetermined number is 512.

5. The method of claim 3 further comprising the step of storing a set of micro-instructions corresponding to a macro-instruction having said entry point address with a plurality of other sets of microcode instructions in a microcode instruction memory, each set of microinstructions being selectable by a different macroinstruction such that the first microcode instruction in a first set of micro-instructions which has a first number of micro-instructions extending beyond said skipping address region is followed by said first number of first microinstructions of subsequent sets of micro-instructions that are fully contained up to the end of the set or up to a jump within the skipping address region.

6. In an apparatus for executing a macro-instruction with a series of microcode instructions in a microcode memory, an improved apparatus for addressing the microcode memory comprising:
   an instruction register for holding said macroinstruction;
   entry point table means, having an input coupled to an output of said instruction register and responsive to said macro-instruction, for providing an entry point address of said microcode memory at an output of said entry point table means for said macro-instruction;
   first means, having an input coupled to said output of said entry point table means, for incrementing an address by a first predetermined number greater than one to provide an address of a next microcode instruction for said macro-instruction;
   second means for incrementing an address by one; and
   means for (a) coupling an output of said first means for incrementing to said microcode memory and to an input of said first means for incrementing in a first, skipping mode of operation and (b) coupling an output of said second means for incrementing to said microcode memory and to an input of said second means for incrementing in a second, normal mode of operation whereby to obtain the address of the next microinstruction during the execution of the macroinstruction the current address is first incremented by said first predetermined number and subsequently incremented by one without reference to the microinstructions.

7. The apparatus of claim 6 wherein said means for providing an entry point address is permanently fixed.

8. The apparatus of claim 6 wherein said first number is 512.

9. The apparatus of claim 6 wherein said first and second means for incrementing comprise a single counter having multiple carry inputs.

10. The apparatus of claim 6 wherein said means for coupling comprises a decode circuit responsive to a state bit indicating that said apparatus is in said skipping mode, said state bit being settable under micro-instruction control to produce a signal to select said first means for incrementing for said first, skipping mode and said second means for incrementing for said second, normal mode.

11. The apparatus of claim 6 wherein said means for coupling is controlled by a bit output of a micro program counter register which is set when a branch is taken, said bit output corresponding to a bit input, and further comprising a microcode instruction register having an output coupled to said bit input.

12. The apparatus of claim 11 wherein said bit output has a separate load enable, and further comprising a control register having an input coupled to said microcode instruction register and an output coupled to said load enable, such that the selection of the skipping or normal mode can be based on a branch in a microinstruction.

13. In an apparatus for executing a macro-instruction with a series of microcode instructions in a microcode memory, an improved apparatus for addressing the microcode memory, comprising:
   an instruction register for holding said macro-instruction;
   entry point table means, having an input coupled to an output of said instruction register and responsive to said macro-instruction, for providing a fixed entry point address of said microcode memory at an output of said entry point table means for said macro-instruction;
   first means, having an input coupled to said output of said entry point table means, for incrementing an address by a first predetermined number greater than one to provide an address of a next microcode instruction for said macro-instruction which skips over the addresses of intervening microcode instructions for other macroinstructions;
   second means for incrementing an address by one;
   a multiplexer having an input coupled to outputs of said first and second means for incrementing and an output coupled to said microcode memory and inputs of said first and second means for incrementing; and
   a decode circuit having an input coupled to an output of said multiplexer and responsive to a portion of a current microcode memory address to produce an output select signal to a select input of said multiplexer to select said first means for incrementing when said current address is within a first, skipping block of addresses and said second means for incrementing when said current address is within a second block of addresses whereby to obtain the address of the next microinstruction during the execution of the macroinstruction the current address is first incremented by said first predetermined number and subsequently incremented by one without reference to the microinstructions.

* * * * *